US011479621B2

(12) United States Patent
Zhang et al.

(10) Patent No.: US 11,479,621 B2
(45) Date of Patent: Oct. 25, 2022

(54) UV-CURABLE COMPOSITION AND ADHESIVE FILM, ADHESIVE TAPE AND BONDING MEMBER CONTAINING THE SAME

(71) Applicant: 3M INNOVATIVE PROPERTIES COMPANY, St. Paul, MN (US)

(72) Inventors: Lijing Zhang, Shanghai (CN); Weigang Lin, Danyang (CN)

(73) Assignee: 3M Innovative Properties Company, St. Paul, MN (US)

( * ) Notice: Subject to any disclaimer, the term of this patent is extended or adjusted under 35 U.S.C. 154(b) by 86 days.

(21) Appl. No.: 17/250,157

(22) PCT Filed: Jun. 12, 2019

(86) PCT No.: PCT/IB2019/054923
§ 371 (c)(1),
(2) Date: Dec. 7, 2020

(87) PCT Pub. No.: WO2020/003041
PCT Pub. Date: Jan. 2, 2020

(65) Prior Publication Data
US 2021/0363276 A1 Nov. 25, 2021

(30) Foreign Application Priority Data
Jun. 27, 2018 (CN) .......................... 201810678157.8

(51) Int. Cl.
C08F 2/46 (2006.01)
C08F 2/50 (2006.01)
C08G 61/04 (2006.01)
C09J 7/38 (2018.01)
C08F 220/18 (2006.01)
C08F 220/32 (2006.01)
C08F 220/06 (2006.01)
C08F 220/14 (2006.01)
C08F 220/20 (2006.01)
C08F 220/36 (2006.01)
C08F 220/56 (2006.01)
C08F 226/06 (2006.01)
C08G 59/24 (2006.01)
(Continued)

(52) U.S. Cl.
CPC .............. *C08F 2/50* (2013.01); *C08F 220/06* (2013.01); *C08F 220/14* (2013.01); *C08F 220/1804* (2020.02); *C08F 220/1808* (2020.02); *C08F 220/20* (2013.01); *C08F 220/325* (2020.02); *C08F 220/36* (2013.01); *C08F 220/56* (2013.01); *C08F 226/06* (2013.01); *C08G 59/245* (2013.01); *C08K 5/37* (2013.01); *C08L 23/0853* (2013.01); *C09J 7/385* (2018.01); *C09J 2301/122* (2020.08); *C09J 2301/124* (2020.08); *C09J 2301/162* (2020.08); *C09J 2301/302* (2020.08); *C09J 2301/414* (2020.08); *C09J 2423/04* (2013.01); *C09J 2431/00* (2013.01); *C09J 2433/00* (2013.01)

(58) Field of Classification Search
CPC ...... C08F 2/50; C08F 220/14; C08F 220/325; C08F 220/36; C08F 220/1808; C08F 220/20; C08F 220/1804; C08F 220/06; C08F 220/56; C09J 133/06; C09J 7/385; C09J 131/04; C09J 2301/124; C09J 2301/122; C09J 2301/162; C09J 2301/302; C09J 2423/04; C09J 2423/00; C09J 2431/00; C09J 2431/414; C08G 59/245; C08K 5/37; C08L 33/06; C08L 23/0853; C08L 31/04; C08L 63/00
USPC ................. 522/63, 6, 189, 184, 71, 1; 520/1
See application file for complete search history.

(56) References Cited

U.S. PATENT DOCUMENTS 6,254,954 B1 7/2001 Bennett
6,274,643 B1 8/2001 Karim
(Continued)

FOREIGN PATENT DOCUMENTS

EP 2128213 12/2009
EP 3133132 2/2017
(Continued)

OTHER PUBLICATIONS

Kelly-Rowley, "Molecular Recognition of Enolates of Active Methylene Compounds in Acetonitrile, The Interplay between Complementarity and Basicity, and the Use of Hydrogen Bonding to Lower Guest $P^Ka$s", Journal of American Chemical Society, Mar. 1995, vol. 117, No. 12, pp. 3438-3447.

(Continued)

*Primary Examiner* — Jessica Whiteley
(74) *Attorney, Agent, or Firm* — Jean A. Lown (57) ABSTRACT

The present disclosure relates to a UV-curable composition and adhesive film, adhesive tape and bonding member containing the same. Said UV-curable composition is a UV-curable composition catalyzable by photobase. Said UV-curable composition comprises (1) acrylic polymer and/or ethylene-vinyl acetate copolymer; (2) curable components, comprising polyfunctional mercaptan and polyfunctional epoxy resin; and a (3) photobase generator. The composition of the present disclosure can be coated into an adhesive tape or adhesive film; such adhesive tape or film possesses initial adhesion before UV curing is carried out and can have the strength of a semi-structural adhesive or a structural adhesive after UV curing is carried out.

15 Claims, 1 Drawing Sheet

(51) Int. Cl.
    *C08K 5/37*         (2006.01)
    *C08L 23/08*       (2006.01)

(56) References Cited

U.S. PATENT DOCUMENTS

| | | |
|---|---|---|
| 2006/0052475 A1 | 3/2006 | Husemann |
| 2010/0129045 A1 | 5/2010 | Shibata et al. |

FOREIGN PATENT DOCUMENTS

| | | | |
|---|---|---|---|
| EP | 3133132 A1 * | 2/2017 | ......... B29C 35/0805 |
| JP | 55125155 | 9/1980 | |
| JP | 2016194447 | 11/2016 | |
| WO | WO 2003-018703 | 3/2003 | |
| WO | WO 2003-033500 | 4/2003 | |
| WO | WO 2008-152956 | 12/2008 | |
| WO | WO 2013-089100 | 6/2013 | |
| WO | WO 2013-130238 | 9/2013 | |
| WO | WO 2013-151739 | 10/2013 | |
| WO | WO 2015-083331 | 6/2015 | |
| WO | WO 2016-195970 | 12/2016 | |

OTHER PUBLICATIONS

Suyama, "Photobase Generators: Recent Progress and Application Trend in Polymer Systems", Progress in Polymer Science, 2009, vol. 34, pp. 194-209.
International Search Report for PCT International Application No. PCT/IB2019/054923, dated Jan. 3, 2020, 7 pages.

* cited by examiner

UV-CURABLE COMPOSITION AND ADHESIVE FILM, ADHESIVE TAPE AND BONDING MEMBER CONTAINING THE SAME

CROSS REFERENCE TO RELATED APPLICATIONS

This application is a national stage filing under 35 U.S.C. 371 of PCT/IB2019/054923, filed Jun. 12, 2019, which claims the benefit of Chinese Patent Application No. 201810678157.8, filed Jun. 27, 2018, the disclosure of which is incorporated by reference herein in its entirety.

TECHNICAL FIELD

The present invention belongs to the field of adhesives, and in particular relates to a UV-curable composition and adhesive film, adhesive tape and bonding member containing the same.

BACKGROUND ART

The UV-curable tape or film has the advantages of being capable of die-cutting, having an initial strength, no squeeze-out and good appearance when it is uncured. The film of the UV-curable tape is composed of three parts, i.e., pressure-sensitive adhesive, curable component and photoinitiator. Conventional UV-curable tape includes the tape of UV free radical curing system and that of UV cationic curing system. For the tape of UV free radical curable system, favorable adhesive strength cannot be formed due to fast curing, and such tape cannot be used for bonding of opaque surfaces. The tape of UV cationic curable system can be used for bonding of opaque surfaces, and the curing speed can be easily adjusted. However, cations are likely to be influenced by moisture and alkaline substances, which can lower the curing speed significantly or cause incomplete curing, let alone the corrosion on metal surfaces caused by the acid produced during cationic curing.

For the tape of a UV cationic curable system, U.S. Pat. No. 6,274,643B1 disclosed a curable composition comprising ethylene-vinyl acetate copolymer (EVA), epoxy resin and cationic photoinitiator. With favorable initial adhesiveness, the adhesive of such curable composition can generate a film through coating and forming that has an overlap shear strength (OLS) of more than 6.9 MPa after curing.

U.S. Pat. No. 6,254,954B1 disclosed a pressure-sensitive adhesive tape based on polyester/epoxy resin/polyhydroxy compound/photoinitiator, which can be cured upon exposure to actinic or e-beam irradiation. However, the tape of the UV cationic curable system is likely to be influenced by moisture and alkaline substances, which can lower the curing speed significantly or cause incomplete curing, and corrosion on metal substrates.

Photobase generators that can produce primary amine, secondary amine, tertiary amine or superbase under UV light are studied in both academic and industrial fields. For instance, photobase generators are generally described in Photobase Generators: Recent Progress and Application Trend in Polymer Systems by Kanji Suyama, Masamitsu Shirai, et al. published on Progress in Polymer Science, 2009, 34, 194-209. Patent Application WO2003/033500A1 disclosed a nitrogen-contained photobase generator with UV activity, which can be used as a photoinitiator to catalyze relevant compound reaction. Patent Application WO2015/083331A1 disclosed a photobase generator that shows less gelation time than conventional photobase generators. These documents only reported photobase generators, not putting forward their application in the adhesive field.

The application of photobase generators in adhesive composition can be listed as follows. Patent Application WO2013/151739A1 disclosed a crosslinkable composition, comprising a (meth)acrylate copolymer component having pendant photobase functional groups and a crosslinking agent having amine-reactive functional groups. With exposure to light, the pendant photobase groups photolyzes to provide pendant amine groups, that react with the amine-reactive functional groups to crosslink the copolymer. Patent Application WO2013/130238A1 provided an ionically crosslinkable composition comprising a (meth)acrylate copolymer component having pendant acid functional groups and pendant photobase functional groups. With exposure to light, the pendant photobase groups photolyze to provide pendant amine groups, that ionically crosslink the copolymer. Patent Application WO2008/152956A1 provided a photocurable pressure-sensitive adhesive composition which has sufficient adhesion before being irradiated with light, a sufficient pot life after being irradiated with light, and a short cure-completion time at a room temperature. The cured product produced from the composition has high adhesion force to the objects to be adhered and excellent durability. The photocurable pressure-sensitive adhesive composition comprises a crosslinking compound (A) that is crosslinkable by the action of a base, a photobase generator (B) which becomes active upon light irradiation to generate a base, and a tackifying component (C). Patent No. US2006/0052475A1 described a UV-initiated thermally cross-linked polyacrylate hotmelt adhesive, which produces basic groups under UV light irradiation that react with the pendant functional groups in polymers to realize crosslinking.

In the above 4 patent documents that use photobase generators in adhesive composition, the crosslinking reactions are all realized through the reaction between the basic groups produced by photobase generators and the functional groups in polymers after UV light irradiation of the crosslinkable compositions. The crosslinking efficiency and the structural strength of the UV-cured composition are both low.

Patent Application WO2013/089100A1 disclosed a curable resin composition and a curing method thereof. The curable resin composition comprises (A) a compound having two or more glycidyl groups in the molecule of component, (B) a compound having two or more thiol groups in the molecule of component and (C) a photobase generator containing an anionic salt. It further disclosed a polymerized component that can be added with (D) photosensitizer and (E) free radical. Adding of (E) can adjust the fluidity of the composition after light irradiation. The curable resin composition can be quickly cured at lower temperatures by irradiation of an active energy ray such as light, having excellent storage stability. However, the resin composition reported in the document neither possesses the property of adhesive tape or film nor die-cutting property and cannot provide initial adhesive property. As the thickness of the adhesive layer cannot be controlled precisely in construction and assembling process, squeeze-out is likely to occur, thus causing the appearance problem and polluting the substrate.

Therefore, it is required to have a UV-curable composition, film and tape that can solve above problems.

SUMMARY

In view of the above problem, the inventor conducted in-depth research and discovered that base-catalyzable UV-curable composition and adhesive film and adhesive tape containing such composition can solve the above problem.

The present disclosure has provided a UV-curable composition, which can be used for manufacturing adhesive tape or film; such adhesive tape or film possesses initial adhesion before UV curing is carried out, thus being able to realize positioning before UV curing is carried out and has the strength of a semi-structural adhesive or a structural adhesive after UV curing is carried out. The photobase generator contained in the adhesive tape and film can generate a base catalyst after being excited by UV light to catalyze the reaction of the curable components in the adhesive tape, so as to increase the structural strength of the adhesive tape. In the present disclosure, no curing reaction occurs or only a small portion of curing reaction occurs, during irradiation with UV light. While after being irradiated by UV light, the adhesive tape/film will achieve a complete curing after a post-curing process for a certain time. The post-curing process can take place at room temperature. An increase of temperature can accelerate the curing. The UV-curable composition of the present disclosure can be used to the adhesion of either UV transparent or non-UV transparent substrates.

Said UV-curable composition comprises (1) (meth)acrylic polymer and/or ethylene-vinyl acetate copolymer; the glass transition temperature Tg for said (meth)acrylic polymer and/or ethylene-vinyl acetate copolymer being −50 to 47° C.; (2) curable components, comprising polyfunctional mercaptan and polyfunctional epoxy resin; and (3) photobase generator. The UV-curable composition of the present disclosure can also comprise (4) photosensitizer. In the UV-curable composition of the present disclosure, with respect to 100 grams of said (meth)acrylic polymer and/or ethylene-vinyl acetate copolymer, said composition comprises:

polyfunctional mercaptan containing 0.01 mole to 1.1 mole of sulfydryl groups;

polyfunctional epoxy resin containing 0.005 mole to 1.05 mole of epoxy groups; and 0.5 to 20 grams of photobase generator.

The molar ratio for the amount of sulfydryl groups in said polyfunctional mercaptan to the epoxy groups in said polyfunctional epoxy resin is 1:3 to 3:1, preferably 1:2 to 2:1 and more preferably 1.2:1 to 1:1.2. Optionally, with respect to 100 grams of said (meth)acrylic polymer and/or ethylene-vinyl acetate copolymer, said composition also comprises 0.15 to 10 grams of photosensitizer.

In the UV-curable composition of the present disclosure, said (meth)acrylic polymer is obtained preferably through the copolymerization of at least one of the below monomers:

(a) non-functional (meth)acrylic monomers, and/or (b) (meth)acryloyl-monomers containing polar functional groups, and/or (c) (meth)acryloyl-monomers containing cross-linking functional groups.

The non-functional (meth)acrylic acid monomers refer to non-functional (meth)acrylic monomers which do not contain any other functional groups except for (meth)acrylate functional groups, e.g., alkyl alkyl (meth)acrylate or aryl aryl (meth)acrylate, preferably acrylic acid C1-12 alkyl ester or methacrylic acid C1-12 alkyl ester, and more preferably C1-8 alkyl ester.

Said (meth)acryoloyl-monomers containing polar functional groups refer to (meth)acryloyl-monomers containing polar functional groups which contain one or more polar functional groups; said polar functional groups can be one or more selected from the group consisting of hydroxyl (OH), ether, amino and acylamino groups. Preferred groups are a hydroxyl (OH), morpholinyl or tetrahydrofuryl group.

Said (meth)acryloyl-monomers containing cross-linking functional groups refer to (meth)acryloyl-monomers containing cross-linking functional groups which can carry out further cross-linking reaction after the copolymerization of the monomers, preferably containing one or more selected from the group consisting of carboxyl (COOH), anhydride group and epoxy groups, such as glycidyl group.

Said (meth)acrylic polymer can also contain units of alkene bond unsaturated monomers from non-(meth)acryloyl-monomers; said alkene bond unsaturated monomers are selected from monomers having polar functional groups or monomers having cross-linking functional groups.

The glass transition temperature Tg of said (meth)acrylic polymer and/or ethylene-vinyl acetate copolymer is −40 to 40° C., preferably −30 to 30° C., and more preferably −20 to 20° C., such as −20 to 0° C.

In said ethylene-vinyl acetate copolymer, the amount of the units from vinyl acetate monomer is no less than 60 wt. % and preferably no less than 80 wt. % or no less than 90 wt. %. There is no particular specification with respect to the upper limit of the ratio of the units from vinyl acetate monomer, as long as it can realize the technical effect of the present invention, e.g., it can be 95 wt. %, 96 wt. %, 97 wt. % or 98 wt. %. The remainder of the copolymer is units from ethylene monomer.

The present disclosure has also provided an adhesive film containing above UV-curable composition. The adhesive film of the present disclosure has die-cutting property, which has an initial peeling force of not less than 0.2 N/mm before UV curing is carried out, and preferably not less than 0.3 N/mm; and the overlap shear strength is not less than 1 MPa after UV curing is carried out, preferably not less than 5 MPa and more preferably not less than 7 MPa.

The present disclosure has also provided an adhesive tape containing the above adhesive film and optional backing and release film/release paper.

The present disclosure has also provided a first member and a second member bonded by the above UV-curable composition or adhesive film. In the bonding member of the present disclosure, after the first member and the second member are initially bonded by the composition or adhesive film of the present disclosure, normally the composition is cured to increase the bonding strength. When the adhesive film is used for bonding, either one of the first member or the second member can be the backing.

A synergistic effect can be obtained through using (meth)acrylic polymer and/or ethylene-vinyl acetate copolymer, curable components and photobase generator in combination. Comparing with UV-curable composition, adhesive film or adhesive tape which do not contain the above components, the UV-curable composition and the adhesive film and adhesive tape containing such composition of the present disclosure have initial adhesiveness, can be die-cut, can provide initial strength, do not have squeeze-out and are good in appearance, before UV curing is carried out. In addition, as the photobase generator in the composition of the present disclosure catalyzes the curing reaction through producing base catalyst, unlike photoacid curing, such curing is not likely to be affected by moisture and alkaline substances, and will not cause corrosion on the surface of metal substrate. In addition, it has high curing efficiency and only needs a small amount of photobase generator to catalyze the crosslinking reaction and reach the strength of semi-structural adhesive or structural adhesive. Generally speaking, a semi-structural adhesive refers to an adhesive with a shear strength of 100 to 1000 psi, i.e., 0.7 to 9 MPa;

and a structural adhesive refers to an adhesive with a shear strength that is greater than 1000 psi, i.e., greater than 7 MPa.

DETAILED DESCRIPTION

The present disclosure is further explained in detail in combination with the examples. It should be appreciated that the present disclosure is not limited to the disclosed examples and its scope is specified by the appended Claims.

UV-Curable Composition

The UV-curable composition of the present disclosure comprises the following components: (1) (meth)acrylic copolymer and/or ethylene-vinyl acetate copolymer (EVA); the glass-transition temperature Tg of the (meth)acrylic copolymer and/or EVA is −50 to 47° C., preferably −40 to 40° C., more preferably −30 to 30° C. and particularly preferably −20 to 20° C., such as −20 to 0° C.; (2) curable component, including polyfunctional thiol and polyfunctional epoxy resin; and (3) photobase generator. The UV-curable composition of the present disclosure may also comprise (4) photosensitizer.

(Meth)Acrylic Polymer

In the UV-curable composition of the present disclosure, the (meth)acrylic polymer comprises at least 1 (meth)acryloyl monomer unit or is formed by at least 1 (meth)acryloyl monomer, preferably comprising at least 2 or 3 (meth)acryloyl monomer units, or being formed by at least 2 or 3 (meth)acryloyl monomers. The (meth)acrylic copolymer is preferably obtained through copolymerization of at least one of the following monomers: (a) non-functional (meth)acrylic monomer; and/or (b) (meth)acryloyl monomer having a polar functional group; and/or (c) (meth)acryloyl monomer having a crosslinking functional group. The above three monomers are to the exclusion of each other.

The non-functional (meth)acrylate monomer can be alkyl (meth)acrylate, cycloalkyl (meth)acrylate or aryl (meth)acrylate, preferably acrylic acid C1-12 alkyl ester or methacrylic acid C1-12 alkyl ester, and more preferably (meth)acrylic C1-8 alkyl ester. The examples of the non-functional (meth)acrylate monomer include (meth)acrylic acid C1-12 alkyl ester, such as methyl (meth)acrylate, ethyl (meth)acrylate, propyl (meth)acrylate, butyl (meth)acrylate, amyl (meth)acrylate, hexyl (meth)acrylate, heptyl (meth)acrylate and ethyl hexyl (meth)acrylate; (meth)acrylic acid C3-C8 cycloalkyl ester, such as cyclopentyl (meth)acrylate and cyclohexyl (meth)acrylate; (meth)acrylic acid C6-C12 aryl ester, such as phenyl (meth)acrylate, naphthyl (meth)acrylate and benzyl (meth)acrylate; and their isomerides, such as isobutyl (meth)acrylate and iso-octyl (meth) acrylate, etc. The term (meth)acryloyl monomer refers to the monomer having (meth)acryloyl in the molecule.

The (meth)acryloyl monomer having a polar functional group excludes the non-functional (meth)acrylate monomer and the (meth)acryloyl monomer having a crosslinking functional group. For the (meth)acryloyl monomer having a polar functional group, one or more polar functional groups selected from hydroxyl, ether group and amide group are preferred, such as one or more polar functional groups selected from hydroxyl, morpholinyl group and tetrahydrofuran group. Through selecting different polar functional groups the film can be adapted to different materials, having better adhesive effect on special substrates or improving the property (such as the resistance to heat and humidity).

The examples of the (meth)acryloyl monomer having a polar functional group include (meth)acrylic hydroxyalkyl esters, such as hydroxymethyl acrylate, hydroxyethyl acrylate, hydroxypropyl acrylate, hydroxybutyl acrylate, hydroxymethyl methylacrylate, hydroxyethyl methylacrylate, hydroxypropyl methylacrylate and hydroxybutyl methylacrylate, etc.; (meth)acrylamides, such as acrylamide, methacrylamide, N,N-dimethylacrylamide, N-hydroxymethyl acrylamide, N-hydroxyethyl acrylamide, N-(butoxy methyl)acrylamide, N-tert-butylacrylamide, diacetone acrylamide, N-[3-(dimethylamino)propyl]methacrylamide, N-(isobutoxy methyl)acrylamide, N-isopropylacrylamide, N-isopropylmethacrylamide, methacrylamide, N-phenylacrylamide and 4-acryloyl morpholine, etc.; (meth)acrylic amino alkyl esters, such as acrylic acid 2-(diethylamino) ethyl ester, acrylic acid 2-(dimethylamino)ethyl ester, acrylic acid 3-(dimethylamino)propyl ester, methacrylic acid 2-(diethylamino)ethyl ester, methacrylic acid 2-(dimethylamino)ethyl ester, methacrylic acid 3-(dimethylamino) propyl ester, etc.; (meth)acrylates having an ether group, such as (ethanediol)ethylether acrylate, di(ethanediol)2-ethylhexyl ether acrylate, crylic acid 2-oxethyl ethyl ester, crylic acid 2-butyl ethyl ether, ethylene glycol dicyclopentyl ether acrylate, ethylene glycol methyl ether acrylate, ethylene glycol phenyl ether acrylate, di(ethanediol)methyl ether methacrylate, methacrylic acid 2-oxethyl ethyl ester, methacrylic acid 2-butyl ethyl ether, ethylene glycol dicyclopentenyl ether methacrylate, ethylene glycol methyl ether methacrylate, ethylene glycol phenyl ether methacrylate, tetrahydrofuryl acrylate and tetrahydrofuryl methacrylate, etc.

The (meth)acryloyl monomer having a crosslinking functional group excludes the non-functional (meth)acrylate monomer and the (meth)acryloyl monomer having a polar functional group. For the (meth)acryloyl monomer having a crosslinking functional group, it may have crosslinking functional groups of carboxyl, anhydride group and epoxy group, etc., the epoxy group of which can be a glycidyl group for example. The crosslinking functional group refers to the functional group that can have further crosslinking reaction after monomer copolymerization. The (meth)acryloyl monomer having a crosslinking functional group also includes the (meth)acryloyl monomer having a precursor functional group of the crosslinking functional group; the precursor functional group of the crosslinking functional group refers to the functional group that can be converted to the crosslinking functional group after monomer copolymerization. The (meth)acryloyl monomer having a crosslinking functional group can be used to crosslink (meth)acrylic polymer and the curable components after UV initiation, so that a film with more density can be obtained and the property can be improved.

The examples of crosslinking (meth)acryloyl monomer include acrylic acid, methacrylic acid, acrylic anhydride, methacrylic anhydride, acrylic acid 2-carboxyl ethyl ester, methacrylic acid 2-carboxyl ethyl ester, glycidyl acrylate and glycidyl methacrylate (GMA), 3,4-epoxycyclohexyl acrylate, 3,4-epoxycyclohexylmethyl acrylate, etc.

The (meth)acrylic polymer may also include ethylenically unsaturated monomer unit from non-(meth)acryloyl monomers. The ethylenically unsaturated monomer can be a monomer having a polar functional group, which can be the same as the above (meth)acryloyl monomer. The ethylenically unsaturated monomer can also be a monomer having a crosslinking functional group. The crosslinking functional group can be the same as the above (meth)acryloyl monomer, such as one or more of carboxyl, anhydride group and epoxy group. For example, the ethylenically unsaturated monomer can be N-vinylpyrrolidone, N-vinylcaprolactam, vinyl acetate, styrene, methyl styrene, vinyltoluene, vinyl propionate, vinyl laurate, vinyl nonanoate, vinyl decanoate, vinyl laurate and vinyl stearate, vinyl chloride, allyl glycidyl ether, vinyl glycidyl ether, O-vinylbenzyl glycidyl ether, M-vinylbenzyl glycidyl ether, P-vinylbenzyl glycidyl ether, acrylonitrile, maleic acid, fumaric acid, itaconic acid, crotonic acid, α-gelinic acid, cinnamic acid and their acid anhydrides or esters.

The (meth)acrylate copolymer in the present disclosure can be commercially purchased or synthesized.

The $T_g$ of (meth)acrylic polymer can be obtained through calculation with Fox equation.

$$1/Tg = \Sigma_i \omega_i / T_{g,i}$$

Wherein, $T_{g,i}$ is the glass-transition temperature of the homopolymer of component i; $\omega_i$ is the weight fraction of component i. In the UV-curable composition of the present disclosure, the glass-transition temperature $T_g$ of the (meth) acrylic polymer can be −50 to 47° C., preferably −40 to 40° C., more preferably −30 to 30° C. and particularly preferably −20 to 20° C., such as −20 to 0° C. When the $T_g$ of (meth)acrylic polymer is higher than 47° C. or lower than −50° C., the OLS of the film obtained from the composition is deteriorated significantly. When the $T_g$ of (meth)acrylic polymer is −40 to 30° C., the OLS of the film can be further improved significantly.

In the UV-curable composition of the present disclosure, the number-average molecular weight of (meth)acrylic copolymer is normally 20,000 to 3,000,000, preferably 50,000 to 2,000,000 and more preferably 100,000 to 1,000,000. The number-average molecular weight can be determined using gel phase chromatograph (GPC).

Ethylene-Vinyl Acetate Copolymer

The ethylene-vinyl acetate copolymer in the present disclosure can be commercially purchased or synthesized.

In the present disclosure, the $T_g$ of ethylene-vinyl acetate copolymer (EVA) can also be obtained through calculation with Fox equation; the $T_g$ can be −50 to 47° C., preferably −40 40° C., more preferably −30 to 30° C. and particularly preferably −20 to 20° C., such as −20 to 0° C. When using EVA, the proportion of the vinyl acetate monomer unit is no less than 60% by weight, preferably no less than 80% by weight and more preferably no less than 90% by weight. The upper limit of the proportion of the vinyl acetate monomer unit can be 95% by weight, 96% by weight, 97% by weight, 98% by weight or 99% by weight. The portion that is not vinyl acetate monomer is ethylene monomer. When the proportion of the vinyl acetate monomer unit is no less than 60% by weight, the film obtained from the composition can have higher OLS.

Polyfunctional Thiol

The polyfunctional thiol in the present disclosure is a compound having 2 or more sulfydryls (thiol groups) in its molecule, preferably a compound having more than 3 sulfydryls (thiol groups). The examples of the polyfunctional thiol include but not limited to trimethylolpropane tris thiopropionate, pentaerythritol tetrakis thiopropionate, ethylene glycol bis thioglycolate, 1,4-butane diol bis thioglycolate, trimethylolpropane tris thioglycolate, pentaerythritol tetrakis thioglycolate, di (2-mercaptoethyl)ether, 1,4-butane dithiol, 1,5-dimercapto-3-toapentan, 1,8-dimercapto-3,6-dioxaoctane, 1,3,5-mercaptomethyl benzene, 4,4'-thio-di benzenethiol, 1,3,5-mercaptomethyl-2,4,6-trimethyl benzene, 2,4,6-torimeru mercapto-s-triazine, 2-dibutylamino-4,6-dimercapto-s-triazine, pentaerythritol tetrakis(3-mercaptopropionate), dipentaerythritol hexa-3-mercaptopropionate, terminal thiol group-containing poly ethers, terminal thiol group-containing polythioethers, thiol compounds obtained by the reaction of an epoxy compound with hydrogen sulfide, terminal thiol group-containing thiol compounds obtained by the reaction of a polythiol compound with epoxy compound, etc. From the prospective of curing property, a thiol compound having more than 3 sulfydryls is preferred.

The commercially available polyfunctional thiol in the present disclosure includes but not limited to JER mate QX11, QX12, JER cure QX30, QX40, QX60, QX900 and KAPUKYUA CP3-800 produced by Japan Epoxy Resins Co. Ltd., OTG, EGTG, TMTG, PETG, 3-MPA, TMTP and PETP produced by Yodo Kagaku Co. Ltd., TEMPIC, TMMP, PEMP, PEMP-II-20P and DPMP produced by Sakai Chemical Co. Ltd., THIOKOL LP-2, LP-3 and polythiol QE-340M produced by Toray Fine Chemicals Co. Ltd., KARENZ MT PE1, NR1 and TPMB produced by Showa Denko K.K. and PETMP produced by TCI Co. Ltd. These compounds can be used separately, or mixed with two or more.

In the UV-curable composition of the present disclosure, the content of polyfunctional thiol is, for every 100 grams of (meth)acrylic polymer and/or ethylene-vinyl acetate copolymer, 0.01 to 1.1 mol (mole) of thiol, preferably 0.1 to 1 mol of thiol and more preferably 0.2 to 0.9 mol of thiol, such as the polyfunctional thiol with 0.3 to 0.7 mol of thiol. When the thiol content for every 100 grams of (meth)acrylic polymer and/or ethylene-vinyl acetate copolymer is within the above range, the tape/film obtained from the composition will have high cohesion strength and favorable initial adhesion, and high overlap shear strength after curing.

Polyfunctional Epoxy Resin

The polyfunctional epoxy resin in the present disclosure refers to the epoxy resin having 2 or more epoxy groups in each molecule on average. The polyfunctional epoxy resin generally comprises glycidyl ethers of etherified polyfunctional phenol, glycidyl amines of epoxidated polyfunctional amine, glycidyl esters of esterified polyfunctional acid, cycloaliphatic epoxy, epoxidized (poly)olefin, etc.

The examples of glycidyl ether epoxy resin include bisphenol A-type epoxy resin (also known as E-type epoxy resin), tetrabromobisphenol A-type epoxy resin, hydrobisphenol A-type epoxy resin, bisphenol F-type epoxy resin, bisphenol S-type epoxy resin, linear phenolic epoxy resin, linear O-phenol formaldehyde polyglycidyl ether and M-phenylene diphenol formaldehyde epoxy resin, etc.

Glycidyl amine epoxy resin is obtained through the reaction of polyamine, the examples of which include triglycidylisocyanurate (TGIC), triglycidyl-p-aminophenol (TGPAP), tetraglycidyl diamino diphenyl methane (TGDDM), two isopropylidene-phenylene-type four-glycidyl amine (TGBAP), Tetramethyl-phenylene isopropylidene four glycidyl amine (TGMBAP), 4,4'-Methylenebis (N,N-diglycidylaniline) (TCDN), N,N,N',N'-tetraglycidyl-2,2-bis[4-(4-aminophenoxy)phenyl]propane (TGBAPOPP), N,N,N',N'-tetraglycidyl-4,4-diamino-3,3-dimethyldiphenylmethane (TGMDT) and tetraglycidyled-4,4'-dianiline ether (TGDAE).

The examples of glycidyl epoxy resin include phthalic diglycidyl ester, hexahydrophthalic diglycidyl ester, p-phthalic diglycidyl ester, isophthalic diglycidyl ester, tetrahydrophthalic acid diglycidyl ester, methyl tetrahydrophthalic acid diglycidyl ester, methyne tetrahydrophthalic acid diglycidyl ester and diglyeidyl adipate, etc.

The examples of cycloaliphatic epoxy include epoxycyclohexanecarboxylates, typified by 3,4-epoxycyclohexylmethyl-3,4-epoxycyclohexanecarboxylate, 3,4-epoxy-2-methylcyclohexylmethyl-3,4-epoxy-2-methylcyclohexane carboxylate, and bis(3,4-epoxy-6-methylcyclohexylmethyl) adipate.

Other useful epoxy resins contain alkenyl oxides (for example, butadiene oxide), such as epoxidized polybutadiene or epoxy-functional silicones.

In the present disclosure, both liquid epoxy resin and solid epoxy resin can be used.

The content of the polyfunctional epoxy resin in the UV-curable composition of the present disclosure is, for every 100 grams of (meth)acrylic polymer and/or ethylene-vinyl acetate copolymer, 0.005 to 1.05 mol of epoxy group, preferably 0.01 to 1 mol of epoxy group and more preferably 0.1 to 0.9 mol of epoxy group, such as the polyfunctional epoxy resin with 0.2 to 0.8 mol or 0.3 to 0.7 mol of epoxy group. When the epoxy group content for every 100 grams of (meth)acrylic polymer and/or ethylene-vinyl acetate copolymer is within the above range, the tape/film obtained from the composition will have high cohesion strength and favorable initial adhesion, and the OLS can also be higher.

In the present disclosure, the proportion of the molar weight of sulfydryls in polyfunctional thiol and the molar weight of epoxy groups in polyfunctional epoxy resin is preferably 1:3 to 3:1, more preferably 1:2 to 2:1 and much more preferably 1.2:1 to 1:1.2, and particularly preferably that the polyfunctional epoxy resin and the polyfunctional thiol are used with equivalent weight.

Photobase Generator

Photobase generator is a compound that can generate alkaline substances under light irradiation. The examples of common photobase generator include cobalt ammine complexes, oximido esters, quaternary ammonium salts and borates, etc. The photobase generator in the present disclosure can be the one existing in the prior art, such as the photobase generators disclosed in the documents (Photobase Generators: Recent Progress and Application Trend in Polymer Systems by Kanji Suyama, Masamitsu Shirai, et al. published in Progress in Polymer Science, 2009, 34, 194-209, Patent Applications WO2003/033500A1 and WO2015/083331A1, which are quoted herein) also listed in the Background Art of the present Application, as long as these photobase generators can generate basic catalysts under light irradiation to catalyze the reaction of thiol and epoxy effectively.

The photobase generator in the composition of the present disclosure catalyzes the curing reaction by generating basic catalysts. Unlike photoacid curing, such curing is not likely to be affected by moisture and alkaline substances, and will not cause corrosion on the surface of metal substrate. In addition, it has high curing efficiency and only needs a small amount of photobase generator to catalyze the crosslinking reaction and reach the strength of semi-structural adhesive or structural adhesive.

The photobase generator can be commercially purchased or synthesized.

In the UV-curable composition of the present disclosure, the dosage of photobase generator can be determined rationally based on the amount of the composition to be cured. For every 100 grams of (meth)acrylic polymer and/or ethylene-vinyl acetate copolymer, the composition contains 0.5 to 20 grams of photobase generator, preferably 0.8 to 15 grams and more preferably 1 to 10 grams. When the content of photobase generator is within the above range, the composition can be fully cured with high OLS, and meanwhile it can prevent photobase generator from separating out from the curable composition and affecting the initial adhesiveness and the final adhesive property.

Photosensitizer

In the present disclosure, photosensitizer can be used in combination with photobase generator, or not used at all. In the case of no photosensitizer, the dosage of photobase generator can be increased to ensure the curing reaction.

Photosensitizer can be any compound that increases the photoactivity for the composition when being used in combination with photobase generator, by means of the sensitization mechanism of energy transfer, electron transfer or proton transfer, etc. Particularly, from the prospective of favorable compatibility to photocuring and excellent photocuring, such substances are preferred as fluorenes, fluorenones, anthraquinones, anthrones, fluoranthenes, benzylacetones, α-hydroxyacetophenones, benzoins, aminoacetophenones, oximinoketones, acylphosphine oxides, naphthalene derivatives, anthracene derivatives, nitrobenzoic acid, nitroaniline, or pigments as riboflavin, rose bengal, eosin, erythrosine, methylene blue or new methylene bluish red.

In the composition of the present disclosure, the dosage of photosensitizer can be determined rationally based on the amount of the photobase generator. For every 100 grams of (meth)acrylic polymer and/or ethylene-vinyl acetate copolymer, the composition contains 0.15 to 10 grams of photosensitizer, preferably 0.5 to 8 grams and more preferably 1 to 5 grams.

Other Components

The composition of the present disclosure can contain other components, such as solvents, etc. The particular types or contents of other components are not to be specified, as long as such components do not affect the curing and adhesive properties of the composition therein.

When a solvent is contained, the content of all kinds of components and the weight of the components are both in dry weight.

Film/Tape

In the present disclosure, the adhesive film can be formed by the UV-curable composition herein. A tape is obtained after the composition of the present disclosure is coated on substrate, release film, or release paper to form a film. The tape can be of the common structure in prior art. For example, it can be adhesive transfer tapes having a release film or release paper on both sides of the film, or single sided tapes having back substrate on one side and release film or release paper on the other side, or double sided tapes having adhesive film on both sides of substrate and furthermore, a double sided adhesive tape with a substrate having a release film or release paper on the outside of the adhesive films on the two sides.

Figure 2:
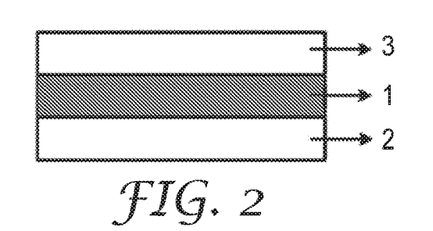
FIG. 2 is a schematic diagram of the adhesive transfer tape without substrate of the present disclosure.

FIG. 2 is a schematic diagram of the tape without substrate of the present disclosure. Mark 1 in the figure shows the film produced by the composition of the present disclosure; marks 2 and 3 refer to release film or release paper, which can be the same or different. The release film or release paper can be the one existing in the prior art, such as PET release film, glass paper, laminated paper and polypropylene film, etc.

Figure 3:
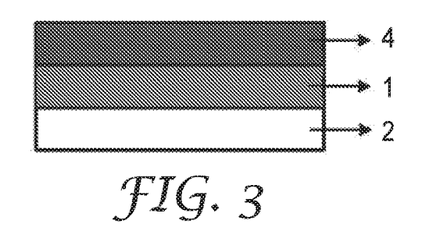
FIG. 3 is the schematic diagram of the single sided tape of the present disclosure.

FIG. 3 is the schematic diagram of the single sided tape of the present disclosure. Number 1 in the figure shows the adhesive film produced by the composition of the present disclosure; number 2 shows the release film (or release paper); number 4 shows the backing of the tape. The backing of the tape can be the one existing in the prior art.

Figure 4:
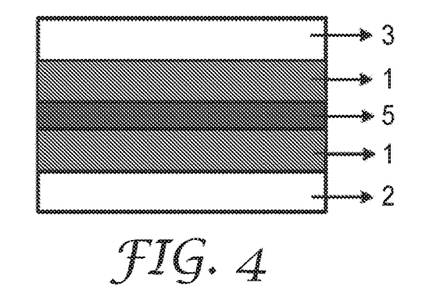
FIG. 4 is a schematic diagram of the double coated tape with substrate of the present disclosure.

FIG. 4 is a schematic diagram of the double sided tape with substrate of the present disclosure. Number 5 in the figure shows the substrate. Number 1 shows the adhesive film. Two pieces of film can be the same or different. Numbers 2 and 3 refer to release film (or release paper). Substrate 5 can be the one existing in the prior art.

Bonding Component

The UV-curable composition or film/tape in the present disclosure can be used to bond parts of various products (e.g., electronic products such as cellphones, computers and smart watches, etc.), so as to form the bonded components.

Bonding components usually include the first and second components bonded by the UV-curable composition or film; wherein, the first component and the second component can be the same or different and can be any parts or components that can be bonded. When a film is used, either one of the first component or the second component can be the backing material.

EXAMPLES

The present disclosure is further explained in details in reference to the examples. It should be appreciated that, the present disclosure is not limited to the disclosed examples below. Unless otherwise specified, the "parts" refer to "parts by weight", "%" refers to "wt. %" and "g" refers to the weight unit "gram".

The raw materials used in the present Application are shown as in the table below.

| Name | Description | Manufacturer |
|---|---|---|
| DBU | 1,8-diazabicyclo undec-7-alkene | Energy Chemical |
| NaBPh$_4$ | Sodium tetraphenylborate | Sinopharm |
| PBD02 | Photobase generator | San-Apro Ltd. |
| UCAT5002 | Photobase generator, containing a compound having 1,8-diazabicyclo[5.4.0]undec-7-alkene structure and salt having tetraphenylborate | San-Apro Ltd. |
| ITX | 4-isopropylthioxanthone | TCI |
| EAQ | 2-ethylanthraquinone | Sinopharm |
| PETMP | 3-mercaptopropionic pentaerythritol ester, SH equivalent weight: 122 grams/equivalent | TCI |
| Karenz MT PE1 | Pentaerythritol butyrate, SH equivalent weight: 136 grams/equivalent | Showa Denko |
| KARENZ MT NR1 | 1,3,5-tri(2-(3-sulfur alkyl butyryl oxide)ethyl-1,3,5-triazine alkyl-2,4,6-triketone, SH equivalent weight: 189 grams/equivalent | Showa Denko |
| EPON 828 | Liquid epoxy resin obtained through bisphenol A, average epoxide equivalent: 188.5 grams/equivalent | Hexion |
| NPES-901 | Solid epoxy resin obtained through bisphenol A, average epoxide equivalent: 475 grams/equivalent | Nanya |
| MA | Methyl acrylate | Huayi |
| MMA | Methyl methacrylate | Huayi |
| BA | Butyl acrylate | Huayi |
| 2-HEA | 2-hydroxyethyl acrylate | BASF |
| AA | Acrylic acid | BASF |
| GMA | Glycidyl methacrylate | Mitsubishi |
| 2-EHA | Iso-octyl acrylate | Huayi |
| BMA | N-butyl methacrylate | Lucite |
| ACM | Acrylamide | Inabata |
| ACMO | 4-acryloyl morpholine | Nantong Wohua |
| MOI | Isocyanatoethyl methacrylate | Showa Denko |
| Sn Catalyst | Dibutyltin dilaurate | Sinopharm |
| MEK | Methyl ethyl ketone | Sinopharm |
| EA | Ethyl acetate | Sinopharm |
| VAZO 67 | Initiator | Dupont |
| LEVAPREN 800 | VA content: 80%, $T_g$: −1° C. | Arlanxeo |
| LEVAPREN 700 | VA content: 70%, $T_g$: −17° C. | Arlanxeo |
| LEVAPREN 900 | VA content: 90%, $T_g$: 19° C. | Arlanxeo |
| LEVAPREN 600 | VA content: 60%, $T_g$: −28° C. | Arlanxeo |
| LEVAPREN 600NPG VP | VA content: 60%, $T_g$: −25° C. | Arlanxeo |
| Pentaerythritol | Pentaerythritol | Sinopharm |

Test Method

Test for Initial Peeling Force

The test measures the force needed for peeling the tape at an angle of 180 degrees by reference to the peeling force test method of ASTM D3330. The tapes in the embodiments are tested as follows:

wiping the stainless steel plate with isopropanol three times before testing;

cutting the single sided tape having a back substrate of 50 μm PET into 0.5 inch;

peeling off the release film and pasting it onto a stainless steel plate, and rolling with a force of 2 kg twice;

before testing, storing the tape in a controlled-climate chamber (23° C./50% relative humidity) for 30 min and testing it with a pulling force tester from Instron Company at a speed of 12 inch/min;

repeating each test twice and taking the average in N/mm.

Test for Overlap Shear Strength (OLS)

The OLS is tested according to ASTM 1002 as follows:

wipe the aluminum strips (4 inch×1 inch×0.0625 inch) with isopropanol three times before testing;

cutting the film sample having release film on both sides into 0.5 inch×1 inch;

peeling off the release film on one side and pasting it onto one aluminum strip;

peeling off the release film on the other side for UV irradiation (using a Fusion D lamp with a UVA of about 3000 mJ/cm$^2$) and pasting the other aluminum strip onto the other side;

post-curing the testing strips in a controlled-climate chamber (23° C./50% relative humidity) for 3 to 4 days for another test; or, curing the prepared strip in a drying oven at 80° C.° C. for 1 hour, then taking it out and measuring it after storing it in a controlled-climate chamber (23° C./50% relative humidity) for 1 day.

For comparison, the OLS of the tape sample was tested without UV irradiation:

wiping the aluminum strip (4 inch×1 inch×0.0625 inch) with isopropanol three times before testing;

cutting the tape sample having release film on both sides into 0.5 inch×1 inch; peeling off the release film on one side and pasting it onto one aluminum strip;

peeling off the release film on the other side, pasting the other aluminum strip onto the other side, curing the sample in a drying oven at 80° C. for 1 hour, then taking it out and measuring it after storing it in a controlled-climate chamber (23° C./50% relative humidity) for 1 day.

The OLS was tested with a pulling force tester from Instron Company at a speed of 5.0 mm/min. Each test was repeated three times and the average in MPa was taken.

SYNTHESIS EXAMPLES

Synthesis Example 1

The photobase generator HDBU·BPh$_4$ is synthesized according the following reference: Molecular Recognition of Enolates of Active Methylene Compounds in Acetonitrile, The Interplay between Complementarity and Basicity, and the Use of Hydrogen Bonding to Lower Guest PKaS, Anne M. Kelly-Rowley, Vincent M. Lynch, Eric V. Anslyn et al., J. Am. Chem. SOC. 1995, 117, 3438-3447.

The Synthesis Method is as Follows:

drop-wise adding 10 wt. % of dilute hydrochloric acid into DBU (12.9 g) until the pH becomes neutral;

dropping NaBPh$_4$ (30.5 g) water solution into acidified DBU solution to obtain white precipitates;

isolating the white precipitates, and carrying out recrystallization, thereby obtaining the HDBU·BPh$_4$ pure product.

Synthesis Example 2

The synthesis example was prepared by mixing 80 parts of MA, 15 parts of BA, 5 parts of GMA, 0.2 part of VAZO 67 and 150 parts of EA in a glass bottle; introducing in nitrogen for two minutes to remove oxygen and then seal; placing the reaction bottle in a polymerization device to carry out polymerization reaction at 60° C. for 24 h; preparing solvent base (meth)acrylic polymer, with the solid content being 40 weight percent.

Synthesis Example 3

The method of Synthesis Example 2 is adopted, 52 parts of MA, 43 parts of BA and 5 parts of GMA are used to prepare solvent base (meth)acrylic polymer, with the solid content being 40 weight percent.

Synthesis Example 4

The method of Synthesis Example 2 is adopted, 58 parts of MA, 40.5 parts of BA, 1 part of AA and 0.5 part of GMA are used to prepare solvent base (meth)acrylic polymer, with the solid content being 40 weight percent.

Synthesis Example 5

The method of Synthesis Example 2 is adopted, 20 parts of MA, 60 parts of BA, 15 parts of ACMO and 5 parts of GMA are used to prepare solvent base (meth)acrylic polymer, with the solid content being 40 weight percent.

Synthesis Example 6

The method of Synthesis Example 2 is adopted, 8 parts of BMA, 77 parts of BA, 10 parts of 2-HEA and 5 parts of ACMO are used to prepare solvent base (meth)acrylic polymer, with the solid content being 40 weight percent.

Synthesis Example 7

The method of Synthesis Example 2 is adopted, 65 parts of BA, 20 parts of 2-EHA, 10 parts of HEA and 5 parts of ACM are used to prepare solvent base (meth)acrylic polymer, with the solid content being 40 weight percent.

Synthesis Example 8

The method of Synthesis Example 2 is adopted, 21.5 parts of 2-EHA, 75 parts of BA and 3.5 parts of AA are used to prepare solvent base (meth)acrylic polymer, with the solid content being 40 weight percent.

Synthesis Example 9

The method of Synthesis Example 2 is adopted, 55 parts of MMA, 40 parts of BA and 5 parts of GMA are used to prepare solvent base (meth)acrylic polymer, with the solid content being 40 weight percent.

Synthesis Example 10

The method of Synthesis Example 2 is adopted, 61.5 parts of MMA, 33.5 parts of BA and 5 parts of GMA are used to prepare solvent base (meth)acrylic polymer, with the solid content being 40 weight percent.

Synthesis Example 11

The method of Synthesis Example 2 is adopted, 67 parts of MMA, 28 parts of BA and 5 parts of GMA are used to prepare solvent base (meth)acrylic polymer, with the solid content being 40 weight percent.

Synthesis Example 12

The method of Synthesis Example 2 is adopted, 69.5 parts of MMA, 25.5 parts of BA and 5 parts of GMA are used to prepare solvent base (meth)acrylic polymer, with the solid content being 40 weight percent.

Synthesis Example 13

The method of Synthesis Example 2 is adopted, 72 parts of MMA, 23 parts of BA and 5 parts of GMA are used to prepare solvent base (meth)acrylic polymer, with the solid content being 40 weight percent.

Synthesis Example 14

The method of Synthesis Example 2 is adopted, 47 parts of MA, 45 parts of BA, 2 parts of 2-HEA and 6 parts of ACMO used to prepare solvent base (meth)acrylic polymer, with the solid content being 34.4 weight percent.

100 parts of above solution (solid content 34.4%), 0.46 part of MOI, one drop of Sn catalyst, 30 parts of MEK are mixed in a glass bottle, and the reaction of the mixture is carried out under room temperature for 12 hours. The solid content of the polymer solution after reaction is 26.5 weight percent.

TABLE 1

Glass Transition Temperatures (Tg) of (Meth)acrylic Polymer Obtained in Synthesis Examples through Calculation with Fox Formula.

| | |
|---|---|
| Synthesis Example 14 | −20 |
| Synthesis Example 13 | 50 |
| Synthesis Example 12 | 45 |
| Synthesis Example 11 | 40 |
| Synthesis Example 10 | 30 |
| Synthesis Example 9 | 19 |
| Synthesis Example 8 | −54 |
| Synthesis Example 7 | −48 |
| Synthesis Example 6 | −40 |
| Synthesis Example 5 | −20 |
| Synthesis Example 4 | −20 |
| Synthesis Example 3 | −20 |
| Synthesis Example 2 | 0 |
| | Tg° C. |

EXAMPLES

Example E1

Evenly mixing 125 parts of (meth)acrylic polymer (40 weight percent of solid content) of Synthesis Example 2, 21.4 parts of PETMP, 30.7 parts of EPON 828, 2 parts of PBD02 and 1 part of ITX; coating one portion of the mixture onto a release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Comparative Example C1

Evenly mixing 125 parts of (meth)acrylic polymer (40 weight percent of solid content) of Synthesis Example 2, 21.4 parts of PETMP and 30.7 parts of EPON 828; coating one portion of the mixture onto a release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Comparative Example C2

Evenly mixing 125 parts of (meth)acrylic polymer (40 weight percent of solid content) of Synthesis Example 2, 21.4 parts of PETMP, 2 parts of PBD02 and 1 part of ITX; coating one portion of the mixture onto a release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Comparative Example C3

Evenly mixing 125 parts of (meth)acrylic polymer (40 weight percent of solid content) of Synthesis Example 2, 30.7 parts of EPON 828, 2 parts of PBD02 and 1 part of ITX; coating one portion of the mixture onto a release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Comparative Example C4

Evenly mixing 125 parts of (meth)acrylic polymer (40 weight percent of solid content) of Synthesis Example 2, 21.4 parts of PETMP, 30.7 parts of EPON 828 and 1 part of ITX; coating one portion of the mixture onto a release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Comparative Example C5

Evenly mixing 80 parts of MA, 15 parts of BA, 5 parts of GMA, 21.4 parts of PETMP, 30.7 parts of EPON 828, 2 parts of PBD02 and 1 part of ITX; coating the mixture onto a release film, and obvious hole shrinkage occurred, which indicates the formulation adopting acrylate monomers does not have good coating performance, and there is no initial cohesion strength before curing.

Comparative Example C6

Evenly mixing 125 parts of (meth)acrylic polymer (40 weight percent of solid content) of Synthesis Example 2, 5.3 parts of pentaerythritol, 30.7 parts of EPON 828, 2 parts of PBD02, and 1 part of ITX; coating one portion of the mixture onto a release film, drying at 90° C. for 15 min, with the thickness of the dry film being 75 μm; covering another layer of release film onto the surface of this adhesive film after drying, for measuring OLS subsequently.

TABLE 2

Overlap Shear (OLS) Strengths of Example E1 and Comparative Examples C1 to C4 and C6 with or without UV Light Radiation

| Examples and Comparative Examples | OLS (MPa) |
|---|---|
| E1-UV | 8.7 |
| E1-no UV | 0.94 |
| C1-UV | 0.99 |
| C1-no UV | 0.78 |
| C2-UV | 0.85 |
| C3-UV | 0.89 |
| C4-UV | 0.75 |
| C6-UV | 0.68 |

For the film of Example E1, the OLS is 8.7 MPa after UV irradiation, and the film is cured at 80° C., while the OLS of the sample without UV irradiation is 0.94 MPa. As for Comparative Example C1 with no photobase generator or photosensitizer added, it is not cured and the OLS is low with or without UV irradiation. As for Comparative Example C2 with no epoxy resin added, Comparative Example C3 with no thiol added and Comparative Example C4 with no photobase added, even with UV irradiation, they are not cured and their OLS is low. As for Comparative Example C5 added with (meth)acryloyl monomer instead of (meth)acrylic copolymer, it has apparent shrink holes after coating. The preparation of the film was failed and the coated product has poor appearance, without initial adhesiveness and cannot be die-cut. As for Comparative Example C6 added with polyalcohol (pentaerythritol) instead of polyfunctional thiol, even with UV irradiation, it has low OLS and cannot achieve the technical effect of the present invention.

Figure 1:
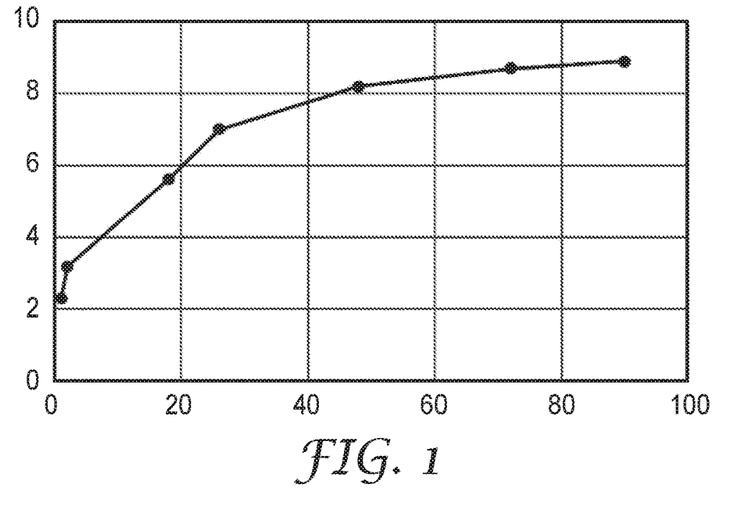
FIG. 1 shows the change of OLS value with the curing time of the film in Example E1 under ambient temperature. Wherein, the abscissa shows the curing time in hour under ambient temperature and the ordinate shows the OLS in MPa.

Example E1 can also be cured at room temperature; see FIG. 1 for OLS for different room temperature curing periods; the OLS of the adhesive film of Example E1 reached 8.9 MPa after 4 days of curing under room temperature.

Example E2

Evenly mixing 125 parts of (meth)acrylic polymer (40 weight percent of solid content) of Synthesis Example 2, 21.6 parts of KARENZ MT PE1, 29.3 parts of EPON 828, 0.35 part of PBD02 and 0.18 part of EAQ; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Example E3

Evenly mixing 125 parts of (meth)acrylic polymer (40 weight percent of solid content) of Synthesis Example 2, 21.6 parts of KARENZ MT PE1, 29.3 parts of EPON 828, 1 part of PBD02, and 0.5 part of EAQ; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Example E4

Evenly mixing 125 parts of (meth)acrylic polymer (40 weight percent of solid content) of Synthesis Example 2, 21.6 parts of KARENZ MT PE1, 29.3 parts of EPON 828, 5 parts of PBD02 and 2.5 part of ITX; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Example E5

Evenly mixing 125 parts of (meth)acrylic polymer (40 weight percent of solid content) of Synthesis Example 2, 21.6 parts of KARENZ MT PE1, 29.3 parts of EPON 828, 8 parts of PBD02 and 4 parts of ITX; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 m, drying at 90° C. for 15 min, with the thickness of the dry film being 75 μm; covering a layer of release film onto the surface of this adhesive film after drying, for measuring the initial peeling force subsequently.

Comparative Example C7

Evenly mixing 125 parts of (meth)acrylic polymer (40 weight percent of solid content) of Synthesis Example 2, 21.6 parts of KARENZ MT PE1, 29.3 parts of EPON 828, 0.10 part of PBD02 and 0.05 parts of EAQ; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 m, drying at 90° C. for 15 min, with the thickness of the dry film being 75 μm; covering a layer of release film onto the surface of this adhesive film after drying, for measuring the initial peeling force subsequently.

Comparative Example C8

Evenly mixing 125 parts of (meth)acrylic polymer (40 weight percent of solid content) of Synthesis Example 2, 21.6 parts of KARENZ MT PE1, 29.3 parts of EPON 828, 12 parts of PBD02 and 6 parts of ITX; coating one portion of the mixture onto a PET release film, drying at 90° C. for 15 min, with the thickness of the dry film being 75 µm; covering another layer of release film onto the surface of this adhesive film after drying, for measuring OLS subsequently; while coating the other portion of mixture onto a PET of 50 µm, drying at 90° C. for 15 min, with the thickness of the dry film being 75 µm; covering a layer of release film onto the surface of this adhesive film after drying, for measuring the initial peeling force subsequently.

The photobase generator (PBD02) was separated out from the adhesive tape after coating, and test was not able to be carried out with respect to the adhesive tape (NM).

TABLE 3

The Contents and Bonding Properties of Each Component in Examples E2-E5 and Comparative Examples C7 and C8

| Examples and Comparative Examples | Polymer* Parts by Weight | Mercaptan Molar sulfhydryl group/100 grams polymer | Epoxy resin Molar epoxy group/100 grams polymer | Photobase generator g/100 grams polymer | Photosensitizer g/100 grams polymer | Overlap Shear Strengths (MPa) |
|---|---|---|---|---|---|---|
| E2 | 50 | 0.317 | 0.311 | 0.7 | 0.36 | 4.7 |
| E3 | 50 | 0.317 | 0.311 | 2 | 1 | 8.4 |
| E4 | 50 | 0.317 | 0.311 | 10 | 5 | 7.9 |
| E5 | 50 | 0.317 | 0.311 | 16 | 8 | 7.2 |
| C7 | 50 | 0.317 | 0.311 | 0.2 | 0.1 | 0.8 |
| C8 | 50 | 0.317 | 0.311 | 24 | 12 | NM |

*Polymer refers to (meth)acrylic polymer or ethylene-vinyl acetate copolymer, and similarly hereinafter.

As shown in Table 3, when the proportion of photobase generator in Comparative Example C7 is too small, the film cannot be fully cured and the OLS is only 0.8 MPa. While in Comparative Example C8, when the proportion of photobase generator is too high, the photobase generator separated out from the tape, thus affecting the initial adhesiveness and the final adhesive property.

Example E6

Evenly mixing 125 parts of (meth)acrylic polymer (40 weight percent of solid content) of Synthesis Example 3, 1.3 parts of KARENZ MT PE1, 0.7 part of EPON 828, 1.0 part of PBD02 and 0.5 part of EAQ; coating one portion of the mixture onto a PET release film, drying at 90° C. for 15 min, with the thickness of the dry film being 75 µm; covering another layer of release film onto the surface of this adhesive film after drying, for measuring OLS subsequently; while coating the other portion of mixture onto a PET of 50 µm, drying at 90° C. for 15 min, with the thickness of the dry film being 75 µm; covering a layer of release film onto the surface of this adhesive film after drying, for measuring the initial peeling force subsequently.

Example E7

Evenly mixing 125 parts of (meth)acrylic polymer (40 weight percent of solid content) of Synthesis Example 3, 1.9 parts of KARENZ MT PE1, 1.5 parts of EPON 828, 1.1 parts of PBD02 and 0.5 part of EAQ; coating one portion of the mixture onto a PET release film, drying at 90° C. for 15 min, with the thickness of the dry film being 75 µm; covering another layer of release film onto the surface of this adhesive film after drying, for measuring OLS subsequently; while coating the other portion of mixture onto a PET of 50 µm, drying at 90° C. for 15 min, with the thickness of the dry film being 75 µm; covering a layer of release film onto the surface of this adhesive film after drying, for measuring the initial peeling force subsequently.

Example E8

Evenly mixing 125 parts of (meth)acrylic polymer (40 weight percent of solid content) of Synthesis Example 3, 6.0 parts of KARENZ MT PE1, 7.3 parts of EPON 828, 1.3 parts of PBD02 and 0.6 part of EAQ; coating one portion of the mixture onto a PET release film, drying at 90° C. for 15 min, with the thickness of the dry film being 75 µm; covering another layer of release film onto the surface of this adhesive film after drying, for measuring OLS subsequently; while coating the other portion of mixture onto a PET of 50 µm, drying at 90° C. for 15 min, with the thickness of the dry film being 75 µm; covering a layer of release film onto the surface of this adhesive film after drying, for measuring the initial peeling force subsequently.

Example E9

Evenly mixing 125 parts of (meth)acrylic polymer (40 weight percent of solid content) of Synthesis Example 3, 9.7 parts of KARENZ MT PE1, 12.5 parts of EPON 828, 1.4 parts of PBD02 and 0.7 part of EAQ; coating one portion of the mixture onto a PET release film, drying at 90° C. for 15 min, with the thickness of the dry film being 75 µm; covering another layer of release film onto the surface of this adhesive film after drying, for measuring OLS subsequently; while coating the other portion of mixture onto a PET of 50 µm, drying at 90° C. for 15 min, with the thickness of the dry film being 75 µm; covering a layer of release film onto the surface of this adhesive film after drying, for measuring the initial peeling force subsequently.

Example E10

Evenly mixing 125 parts of (meth)acrylic polymer (40 weight percent of solid content) of Synthesis Example 3, 14.7 parts of KARENZ MT PE1, 19.5 parts of EPON 828, 1.7 parts of PBD02 and 0.8 part of EAQ; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Example E11

Evenly mixing 125 parts of (meth)acrylic polymer (40 weight percent of solid content) of Synthesis Example 2, 32.0 parts of KARENZ MT PE1, 43.8 parts of EPON 828, 2.5 parts of PBD02 and 1.3 parts of EAQ; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Example E12

Evenly mixing 125 parts of (meth)acrylic polymer (40 weight percent of solid content) of Synthesis Example 2, 49.3 parts of KARENZ MT PE1, 68.1 parts of EPON 828, 3.3 parts of PBD02 and 1.7 parts of EAQ; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Example E13

Evenly mixing 125 parts of (meth)acrylic polymer (40 weight percent of solid content) of Synthesis Example 2, 63.2 parts of KARENZ MT PE1, 87.6 parts of EPON 828, 4 parts of PBD02 and 2 parts of EAQ; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Comparative Example C9

Evenly mixing 125 parts of (meth)acrylic polymer (40 weight percent of solid content) of Synthesis Example 3, 1 part of PBD02 and 0.5 part of EAQ; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Comparative Example C10

Evenly mixing 125 parts of (meth)acrylic polymer (40 weight percent of solid content) of Synthesis Example 2, 83.9 parts of KARENZ MT PE1, 116.8 parts of EPON 828, 4 parts of PBD02 and 2 parts of EAQ; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

TABLE 4

Contents and Bonding Performances of Each Component in Examples E6 to E13 and Comparative Examples C9 and C10

| Examples and Comparative Examples | Polymer Parts by Weight | Mercaptan Molar sulfhydryl group/100 grams polymer | Epoxy resin Molar epoxy group/100 grams polymer | Photobase generator g/100 grams polymer | Photosensitizer g/100 grams polymer | Overlap Shear Strength (MPa) | Mercaptan Molar sulfhydryl group/ 100 grams polymer |
|---|---|---|---|---|---|---|---|
| E6  | 50 | 0.019 | 0.007 | 2   | 1   | 0.58 | 2.3 |
| E7  | 50 | 0.028 | 0.016 | 2.2 | 1   | 0.63 | 3.7 |
| E8  | 50 | 0.088 | 0.077 | 2.6 | 1.2 | 0.59 | 4.0 |
| E9  | 50 | 0.142 | 0.133 | 2.8 | 1.4 | 0.52 | 5.1 |
| E10 | 50 | 0.216 | 0.207 | 3.4 | 1.6 | 0.37 | 8.9 |
| E11 | 50 | 0.470 | 0.465 | 5   | 2.6 | 0.45 | 8.6 |
| E12 | 50 | 0.724 | 0.723 | 6.6 | 3.4 | 0.39 | 8.0 |
| E13 | 50 | 0.928 | 0.929 | 8   | 4   | 0.30 | 8.5 |
| C9  | 50 | 0     | 0     | 2   | 1   | 0.65 | 0.8 |
| C10 | 50 | 1.232 | 1.239 | 8   | 4   | 0.10 | 8.9 |

As shown in Table 4, in Comparative Example C9, when polyfunctional thiol or polyfunctional epoxy resin is not added, the OLS is lower than 1 Mpa, which cannot meet the requirement; as for Comparative Example C10, when the proportion of polyfunctional thiol and polyfunctional epoxy resin is high, the cohesion strength of the tape/film is poor and the initial peeling fore is only 0.1 N/mm, which cannot meet the requirement.

Example E14

Evenly mixing 125 parts of (meth)acrylic polymer (40 weight percent of solid content) of Synthesis Example 3, 21.6 parts of KARENZ MT PE1, 29.2 parts of EPON 828, 2 parts of PBD02 and 1 part of EAQ; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Example E15

Evenly mixing 125 parts of (meth)acrylic polymer (40 weight percent of solid content) of Synthesis Example 4, 21.6 parts of KARENZ MT PE1, 29.2 parts of EPON 828, 2 parts of PBD02 and 1 part of EAQ; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Example E16

Evenly mixing 125 parts of (meth)acrylic polymer (40 weight percent of solid content) of Synthesis Example 5, 21.6 parts of KARENZ MT PE1, 29.2 parts of EPON 828, 2 parts of PBD02 and 1 part of EAQ; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Example E17

Evenly mixing 125 parts of (meth)acrylic polymer (40 weight percent of solid content) of Synthesis Example 6, 21.6 parts of KARENZ MT PE1, 29.2 parts of EPON 828, 2 parts of PBD02 and 1 part of EAQ; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Example E18

Evenly mixing 125 parts of (meth)acrylic polymer (40 weight percent of solid content) of Synthesis Example 7, 21.6 parts of KARENZ MT PE1, 29.2 parts of EPON 828, 2 parts of PBD02 and 1 part of EAQ; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Example E19

Evenly mixing 125 parts of (meth)acrylic polymer (40 weight percent of solid content) of Synthesis Example 9, 21.6 parts of KARENZ MT PE1, 29.2 parts of EPON 828, 2 parts of PBD02 and 1 part of EAQ; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Example E20

Evenly mixing 125 parts of (meth)acrylic polymer (40 weight percent of solid content) of Synthesis Example 10, 21.6 parts of KARENZ MT PE1, 29.2 parts of EPON 828, 2 parts of PBD02 and 1 part of EAQ; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Example E21

Evenly mixing 125 parts of (meth)acrylic polymer (40 weight percent of solid content) of Synthesis Example 11, 21.6 parts of KARENZ MT PE1, 29.2 parts of EPON 828, 2 parts of PBD02 and 1 part of EAQ; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Example E22

Evenly mixing 125 parts of (meth)acrylic polymer (40 weight percent of solid content) of Synthesis Example 12, 21.6 parts of KARENZ MT PE1, 29.2 parts of EPON 828, 2 parts of PBD02 and 1 part of EAQ; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Example E23

Evenly mixing 125 parts of (meth)acrylic polymer (40 weight percent of solid content) of Synthesis Example 14, 21.6 parts of KARENZ MT PE1, 29.2 parts of EPON 828, 2 parts of PBD02 and 1 part of ITX; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Comparative Example C11

Evenly mixing 125 parts of (meth)acrylic polymer (40 weight percent of solid content) of Synthesis Example 8, 21.6 parts of KARENZ MT PE1, 29.2 parts of EPON 828, 2 parts of PBD02 and 1 part of EAQ; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

The OLS of the adhesive film prepared in Comparative Example C11 is relatively low.

Comparative Example C12

Evenly mixing 125 parts of (meth)acrylic polymer (40 weight percent of solid content) of Synthesis Example 13, 21.6 parts of KARENZ MT PE1, 29.2 parts of EPON 828, 2 parts of PBD02 and 1 part of EAQ; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

The bonding performance of the adhesive tape/adhesive film prepared in Comparative Example C12 is very poor and the corresponding test cannot be carried out.

TABLE 5

$T_g$ and Bonding Performances of Polymers in Examples E14 to E23 and Comparative Examples C11 and C12

| Examples and Comparative Examples | $T_g$ (° C.) | Initial Peeling Force (N/mm) | Overlap Shear Strength (MPa) |
|---|---|---|---|
| E14 | −20 | 0.47 | 8.1 |
| E15 | −20 | 0.5 | 7.9 |
| E16 | −20 | 0.49 | 8.2 |
| E17 | −40 | 0.35 | 7.2 |
| E18 | −48 | 0.32 | 3.3 |
| E19 | 19 | 0.43 | 8.4 |
| E20 | 30 | 0.50 | 7.3 |
| E21 | 40 | 0.21 | 2.7 |
| E22 | 45 | 0.22 | 2.7 |
| E23 | −20 | 0.42 | 10.9 |
| C11 | −54 | NM | 0.90 |
| C12 | 50 | NM | NM |

As shown in Table 5, in Examples 14-23, when the glass-transition temperature of (meth)acrylic copolymer is −50 to 47° C., the obtained film has favorable property. In Comparative Example C11, when Tg is lower than −50° C., the adhesion and initial adhesion of the obtained film and PET substrate are poor, the initial peel force cannot be measured and the OLS is very low; in Comparative Example C12, when Tg is higher than 47° C., the initial adhesiveness of the obtained tape/film is poor and the initial peel force and OLS cannot be measured. Particularly, in Examples E17 and E20, the OLS exceeds 7 MPa when Tg is −40 to 30° C., which shows an outstanding technical effect has been achieved.

Example E24

Evenly mixing 125 parts of (meth)acrylic polymer (40 weight percent of solid content) of Synthesis Example 3, 88.3 parts of KARENZ MT NR1, 87.6 parts of EPON 828, 4.5 parts of PBD02 and 2.2 parts of EAQ; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 5 Om, drying at 90° C. for 15 min, with the thickness of the dry film being 75 μm; covering a layer of release film onto the surface of this adhesive film after drying, for measuring the initial peeling force subsequently.

Example E25

Evenly mixing 125 parts of (meth)acrylic polymer (40 weight percent of solid content) of Synthesis Example 3, 64 parts of KARENZ MT PE1, 52.5 parts of EPON 828, 105.5 parts of NPES-901, 5.5 parts of PBD02, and 2.8 parts of EAQ; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Comparative Example C13

Evenly mixing 125 parts of (meth)acrylic polymer (40 weight percent of solid content) of Synthesis Example 3, 64 parts of KARENZ MT PE1, 255 parts of NPES-901, 7.3 parts of PBD02, and 3.6 parts of EAQ; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

The adhesive film prepared in Comparative Example C13 has no initial adhesion and the initial peeling force test cannot be carried out.

TABLE 6

Contents and Bonding Performances of Each Component in Examples E24 and E25 and Comparative Example C13.

| Examples and Comparative Examples | Polymer Parts by Weight | Mercaptan Molar sulfhydryl group/100 grams polymer | Epoxy resin Molar epoxy group/100 grams polymer | Photobase generator g/100 grams polymer | Photosensitizer g/100 grams polymer | Initial Peeling Force (N/mm) | OLS (MPa) |
|---|---|---|---|---|---|---|---|
| E24 | 50 | 0.933 | 0.929 | 9 | 4.4 | 0.40 | 7.3 |
| E25 | 50 | 0.940 | 1.001 | 11 | 5.6 | 1.01 | 8.2 |
| C13 | 50 | 0.940 | 1.074 | 14.6 | 7.2 | NM | NM |

NPES-901 is a solid epoxy resin. It is clear from the above examples and comparative examples that, in Example E25, the film still can be cured and reach a certain structural strength when added with solid epoxy resin; in Comparative Example C13, the film is likely to lose its initial adhesiveness when the proportion of solid epoxy resin is too high.

Example E26

Evenly mixing 125 parts of (meth)acrylic polymer (40 weight percent of solid content) of Synthesis Example 2, 21.6 parts of KARENZ MT PE1, 29.2 parts of EPON 828, 1 part of UCAT5002 and 0.5 part of ITX; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Example E27

Evenly mixing 125 parts of (meth)acrylic polymer (40 weight percent of solid content) of Synthesis Example 2, 21.6 parts of KARENZ MT PE1, 29.2 parts of EPON 828, 1 part of HDBU·BPh$_4$ and 0.5 part of ITX; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Example E28

Evenly mixing 125 parts of (meth)acrylic polymer (40 weight percent of solid content) of Synthesis Example 2, 21.6 parts of KARENZ MT PE1, 29.2 parts of EPON 828 and 2 parts of HDBU·BPh$_4$; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

TABLE 7

Bonding Performances of Examples E26 to E28

| Examples | Overlap Shear Strength(MPa) |
|---|---|
| E26 | 8.9 |
| E27 | 10.2 |
| E28 | 9.3 |

As shown in Table 7, in Examples E26-28, when other photobase generators such as UCAT5002 and HDBU·BPh$_4$ are used, the film still can cure and show an outstanding bonding performance.

Example E29

Dissolving 37.5 parts of LEVAPREN 800 (from ethylene-vinyl acetate copolymer with the unit weight ratio of 80% for the vinyl acetate monomers) and 12.5 parts of LEVAPREN 700 (from ethylene-vinyl acetate copolymer with the unit weight ratio of 70% for the vinyl acetate monomers) in 116.7 parts of acetic ether, then adding in 0.85 part of KARENZ MT PE1, 1.2 parts of EPON 828, 1.1 parts of PBD02 and 0.5 part of EAQ, and then evenly mixing;

coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Example E30

Dissolving 50 parts of LEVAPREN 800 in 116.7 parts of acetic ether, then adding in 3.3 parts of KARENZ MT PE1, 3.2 parts of EPON 828, 1.1 parts of PBD02 and 0.6 part of EAQ, and then evenly mixing; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Example E31

Dissolving 50 parts of LEVAPREN 800 in 116.7 parts of acetic ether, then adding in 20.8 parts of KARENZ MT PE1, 29.2 parts of EPON 828, 2 parts of PBD02 and 1 part of EAQ, and then evenly mixing; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Example E32

Dissolving 50 parts of LEVAPREN 800 in 116.7 parts of acetic ether, then adding in 62.4 parts of KARENZ MT PE1, 87.6 parts of EPON 828, 4 parts of PBD02 and 2 parts of EAQ, and then evenly mixing; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Example E33

Dissolving 50 parts of LEVAPREN 900 in 116.7 parts of acetic ether, then adding in 20.8 parts of KARENZ MT PE1, 29.2 parts of EPON 828, 2 parts of PBD02 and 1 part of EAQ, and then evenly mixing; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Example E34

Dissolving 50 parts of LEVAPREN 600 in 116.7 parts of acetic ether, then adding in 20.8 parts of KARENZ MT PE1, 29.2 parts of EPON 828, 2 parts of PBD02 and 1 part of EAQ, and then evenly mixing; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Example E35

Dissolving 50 parts of LEVAPREN 600 NPG VP in 116.7 parts of acetic ether, then adding in 20.8 parts of KARENZ MT PE1, 29.2 parts of EPON 828, 2 parts of PBD02 and 1 part of EAQ, and then evenly mixing; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Comparative Example C14

Dissolving 50 parts of LEVAPREN 800 in 116.7 parts of acetic ether, then adding in 1 part of PBD02 and 0.5 part of EAQ, and then evenly mixing; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Comparative Example C15

Dissolving 50 parts of LEVAPREN 800 in 116.7 parts of acetic ether, then adding in 83.2 parts of KARENZ MT PE1, 116.8 parts of EPON 828, 5 parts of PBD02 and 2.5 parts of EAQ, and then evenly mixing; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Comparative Example C16

Dissolving 50 parts of LEVAPREN 800 in 116.7 parts of acetic ether, then adding 20.8 parts of PE1, 2 parts of PBD02 and 1 part of EAQ, and then evenly mixing; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Comparative Example C17

Dissolving 50 parts of LEVAPREN 800 in 116.7 parts of acetic ether, then adding in 29.2 parts of EPON 828, 2 parts of PBD02 and 1 part of EAQ, and then evenly mixing; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

Comparative Example C18

Dissolving 50 parts of LEVAPREN 800 in 116.7 parts of acetic ether, then adding 20.8 parts of PE1, 29.2 parts of EPON 828 and 1 part of EAQ, and then evenly mixing; coating one portion of the mixture onto a PET release film, drying at 90° C. for 15 min, with the thickness of the dry film being 75 μm; covering another layer of release film onto the surface of this adhesive film after drying, for measuring OLS subsequently; while coating the other portion of mixture onto a PET of 50 μm, drying at 90° C. for 15 min, with the thickness of the dry film being 75 μm; covering a layer of release film onto the surface of this adhesive film after drying, for measuring the initial peeling force subsequently.

TABLE 8

Contents and Bonding Performances of Each Component in Examples E29 to E35 and Comparative Examples C14 to C18.

| Examples and Comparative Examples | Polymer Parts by Weight | Mercaptan Molar sulfhydryl group/100 grams polymer | Epoxy resin Molar epoxy group/100 grams polymer | Photobase generator g/100 grams polymer | Photosensitizer g/100 grams polymer | Initial Peeling Force (N/mm) | OLS (MPa) |
|---|---|---|---|---|---|---|---|
| E29 | 50 | 0.012 | 0.013 | 2.2 | 1 | 0.58 | 2.3 |
| E30 | 50 | 0.048 | 0.034 | 2.2 | 1.2 | 0.59 | 2.8 |
| E31 | 50 | 0.305 | 0.310 | 4 | 2 | 0.62 | 9.2 |
| E32 | 50 | 0.916 | 0.929 | 8 | 4 | 0.29 | 9.9 |
| E33 | 50 | 0.305 | 0.310 | 4 | 2 | 0.39 | 9.2 |
| E34 | 50 | 0.305 | 0.310 | 4 | 2 | 0.80 | 4.8 |
| E35 | 50 | 0.305 | 0.310 | 4 | 2 | 0.66 | 6.8 |
| C14 | 50 | 0 | 0 | 2 | 1 | NM | 0.9 |
| C15 | 50 | 1.222 | 1.239 | 10 | 5 | 0.09 | 9.0 |
| C16 | 50 | 0.306 | 0 | 4 | 2 | 0.65 | 0.81 |
| C17 | 50 | 0 | 0.310 | 4 | 2 | 0.63 | 0.85 |
| C18 | 50 | 0.306 | 0.310 | 0 | 2 | 0.59 | 0.77 |

As shown in Table 8, in Comparative Example C14, when thiol and epoxy are not added, the initial peel force of the film cannot be measured and the OLS is low; in Comparative Example C15, when the amount of thiol and epoxy is too high, the initial cohesion force of the tape is poor, which cannot meet the requirement. As for Comparative Example C16 with no epoxy resin added, Comparative Example C17 with no thiol added and Comparative Example C18 with no photobase added, even with UV irradiation, the OLS is low. In Examples E29-35, when the proportion of the vinyl acetate monomer unit in EVA is equal to or more than 60% by weight, an outstanding OLS can be achieved. When the proportion of the vinyl acetate monomer unit in EVA is equal to or more than 80% by weight, more outstanding OLS can be achieved.

The examples are provided above to further describe the present invention; however, it should be appreciated that, the protection scope of the present invention is specified by the appended Claims rather than by the examples described. Those skilled in the art should appreciate that, various modifications and changes can be made without departing from the scope of the present invention. These modifications and changes shall fall into the protection scope of the present invention, which is specified by the Claims.

The invention claimed is:

1. A UV-curable composition, comprising:
   (1) a (meth)acrylic polymer and/or an ethylene-vinyl acetate copolymer; the glass transition temperature Tg for said (meth)acrylic polymer and/or ethylene-vinyl acetate copolymer being −50 to 47° C.;
   (2) curable components, comprising a polyfunctional mercaptan and a polyfunctional epoxy resin, wherein
      (a) said polyfunctional mercaptan is a mercaptan compound having 2 or more sulfhydryl groups, wherein the UV-curable composition contains 0.01 to 1.1 moles of sulfhydryl groups per 100 grams of said (meth)acrylic polymer and/or ethylene-vinyl acetate copolymer; and
      (b) said polyfunctional epoxy resin is an epoxy resin having 2 or more epoxy groups, wherein the UV-curable composition contains 0.005 to 1.05 moles of epoxy groups per 100 grams of said (meth)acrylic polymer and/or ethylene-vinyl acetate copolymer and wherein the molar ratio for the amount of sulfhydryl groups in said polyfunctional mercaptan to the epoxy groups in said polyfunctional epoxy resin is 1.2:1 to 1:1.2; and
   (3) a photobase generator, wherein the UV-curable composition contains 0.5 to 20 grams of the photobase generator per 100 grams of said (meth)acrylic polymer and/or ethylene-vinyl acetate copolymer.

2. The UV-curable composition according to claim 1, wherein with respect to 100 grams of said (meth)acrylic polymer and/or ethylene-vinyl acetate copolymer, said composition comprises:
   polyfunctional mercaptan containing 0.1 mole to 1 mole of sulfhydryl groups; and
   polyfunctional epoxy resin containing 0.1 mole to 0.9 mole of epoxy groups.

3. The UV-curable composition according to claim 1, wherein, with respect to 100 grams of said (meth)acrylic polymer and/or ethylene-vinyl acetate copolymer, said UV-curable composition also comprises 0.15 to 10 grams of photosensitizer.

4. The UV-curable composition according to claim 1, wherein in said ethylene-vinyl acetate copolymer, the units from vinyl acetate monomer is no less than 60 wt. %; and
   wherein the monomers forming said (meth)acrylic polymer are selected from:
      (a) non-functional (meth)acrylic monomers, and/or
      (b) (meth)acryloyl-monomers containing polar functional groups, and/or
      (c) (meth)acryloyl-monomers containing cross-linking functional groups.

5. The UV-curable composition according to claim 4, wherein, said non-functional (meth)acrylic monomers are selected from alkyl (meth)acrylate or aryl (meth)acrylate.

6. The UV-curable composition according to claim 4, wherein, said polar functional groups are one or more selected from the group consisting of hydroxyl, ether, amino and acylamino groups.

7. The UV-curable composition according to claim 4, wherein, said cross-linking functional groups are one or more selected from the group consisting of carboxyl groups, anhydride groups and epoxy groups.

8. The UV-curable composition according to claim 4, wherein, said (meth)acrylic polymer also contains units of alkene bond unsaturated monomers from non-(meth)acryloyl-monomers.

9. The UV-curable composition according to claim 8, wherein, said alkene bond unsaturated monomers are selected from monomers having polar functional groups or monomers having cross-linking functional groups.

10. The UV-curable composition according to claim 1, wherein the glass transition temperature $T_g$ of said (meth)acrylic polymer and/or ethylene-vinyl acetate copolymer is −40 to 40° C.

11. An adhesive film, which comprises the UV-curable composition according to claim 1.

12. The adhesive film according to claim 11, wherein said adhesive film has die-cutting property, which has an initial peeling force of not less than 0.2 N/mm before UV curing is carried out; and the overlap shear strength is not less than 1 MPa after UV curing is carried out.

13. An adhesive tape, which comprises the adhesive film according to claim 11.

14. A bonded member, which comprises: the first member and/or the second member bonded by the UV-curable composition according to claim 1.

15. The bonding member according to claim 14, wherein said UV-curable composition is cured, and/or said first member or second member are substrates.

* * * * *